(12) United States Patent   (10) Patent No.: US 11,790,040 B2
Song et al.                      (45) Date of Patent:     Oct. 17, 2023

(54) METHOD FOR OBJECT DETECTION AND RECOGNITION BASED ON NEURAL NETWORK

(71) Applicant: Dibi (Chongqing) Intelligent Technology Research Institute Co., Ltd., Chongqing (CN)

(72) Inventors: Yongduan Song, Chongqing (CN); Shilei Tan, Chongqing (CN); Li Huang, Chongqing (CN); Ziqiang Jiang, Chongqing (CN); Jian Liu, Chongqing (CN); Lihui Tan, Chongqing (CN)

(73) Assignee: DIBI (CHONGQING) INTELLIGENT TECHNOLOGY RESEARCH INSTITUTE CO., LTD., Chongqing (CN)

( * ) Notice: Subject to any disclaimer, the term of this patent is extended or adjusted under 35 U.S.C. 154(b) by 244 days.

(21) Appl. No.: 17/368,946

(22) Filed: Jul. 7, 2021

(65) Prior Publication Data

US 2022/0292311 A1    Sep. 15, 2022

(30) Foreign Application Priority Data

Mar. 12, 2021    (CN) .......................... 202110268857.1

(51) Int. Cl.
G06F 18/214       (2023.01)
G06N 3/08         (2023.01)
G06T 3/40         (2006.01)
G06F 18/2415      (2023.01)

(52) U.S. Cl.
CPC ...... *G06F 18/2148* (2023.01); *G06F 18/2415* (2023.01); *G06N 3/08* (2013.01); *G06T 3/4046* (2013.01)

(58) Field of Classification Search
CPC ... G06F 18/2148; G06F 18/2415; G06N 3/08; G06T 3/4046
See application file for complete search history.

(56) References Cited

U.S. PATENT DOCUMENTS

| | | | |
|---|---|---|---|
| 11,188,746 B1 * | 11/2021 | Patel | G06N 3/08 |
| 2020/0327465 A1 * | 10/2020 | Baek | G16H 20/30 |
| 2021/0383533 A1 * | 12/2021 | Zhao | G06V 20/64 |
| 2022/0207305 A1 * | 6/2022 | Mosayyebpour Kaskari | G06F 18/253 |

* cited by examiner

*Primary Examiner* — Qun Shen
(74) *Attorney, Agent, or Firm* — Williams Mullen; Thomas F. Bergert

(57) ABSTRACT

The present disclosure provides a method for object detection and recognition based on a neural network. The method includes: adding a detection layer following three detection layers of an existing YOLOv5 network model, to construct a new YOLOv5 network model; then, training the new YOLOv5 network model by considering an overlapping area between a predicted box and a ground truth box, a center-to-center distance between the two boxes, and an aspect ratio of the two boxes; and finally, inputting a to-be-detected image into the trained new YOLOv5 network model, outputting a predicted box of an object and probability values corresponding to a class to which the object belongs, and setting a class corresponding to a maximum probability value as a predicted class of the object in the to-be-detected image. This method can quickly and effectively detect multiple classes of objects. Especially, a detection effect for small objects is more ideal.

2 Claims, 1 Drawing Sheet

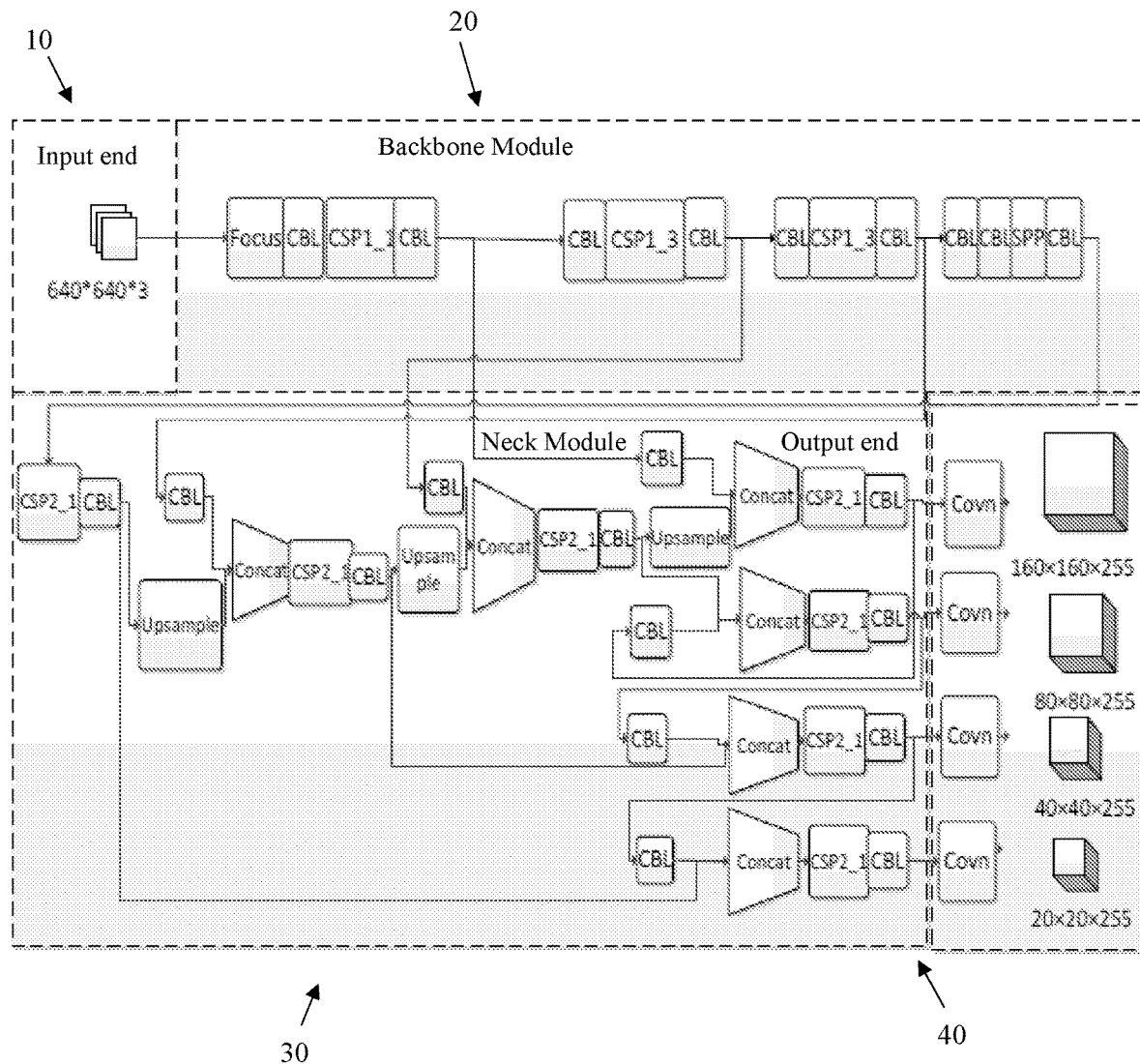

METHOD FOR OBJECT DETECTION AND RECOGNITION BASED ON NEURAL NETWORK

CROSS REFERENCE TO RELATED APPLICATION

This patent application claims the benefit and priority of Chinese Patent Application No. 202110268857.1 filed on Mar. 12, 2021, the disclosure of which is incorporated by reference herein in its entirety as part of the present application.

TECHNICAL FIELD

The present disclosure relates to the field of computer vision and image processing technologies, and in particular, to a method for object detection and recognition based on a neural network.

BACKGROUND ART

In recent years, with the evolution of artificial intelligence technologies and improvement in computing power of computing devices, artificial intelligence algorithms have been widely used in military and civilian areas. As a major branch of the field of artificial intelligence, computer vision has been a research hotspot at home and abroad, and it mainly finds applications in image and video processing. Object detection and recognition in video processing promote widespread practical applications, such as face recognition, ship detection, detection and recognition for road signs and obstacles in automatic driving, and the like, all of which require detection algorithms with high accuracy and real-time performance.

The existing methods for object detection and recognition based on the neural network are mainly classified into two types. The first type is based on region proposal, in which candidate region frames are first generated, and then classified. The mainstream methods include SPP, R-CNN, Fast R-CNN, etc. These methods have high detection accuracy but low speed, and cannot meet the real-time detection requirements. The other type is end-to-end methods. Commonly used methods are SSD, RetinaNet, YOLOv3, etc. These methods have fast detection speed but lower accuracy. In order to improve the detection performance, the scholars have committed to improving the two types of methods described above to better satisfy the actual needs. However, due to limitations of the model structure, the above methods are unable to achieve a faster detection speed.

YOLOv5 is the latest network model proposed in 2020. It has greatly improved the detection accuracy and speed, but is not doing very well in small object extraction.

SUMMARY

In view of the above-mentioned issues in the prior art, the technical problem to be solved in the present disclosure is that, during object detection and recognition, it is prone to false negative and false positive in the case where small objects are compactly arranged and multiple objects are compactly arranged.

To solve the above technical problems, the present disclosure adopts the following technical solutions: a method for object detection and recognition based on a neural network, including the following steps:

S100: constructing a new YOLOv5 network model by adding a detection layer following three detection layers of an existing YOLOv5 network model;

S200: training the new YOLOv5 network model, where a specific training process comprises:

S210: constructing a training data set: acquiring N images, resizing each of the images to make it suitable for model training, and labeling each of the images, to be specific, labeling the image with ground truth boxes and object class labels, where all of the labeled images constitute the training data set;

S220: setting thresholds for a center-to-center distance and an aspect ratio of the new YOLOv5 network model;

S230: initializing parameters in the new YOLOv5 network model;

inputting all samples of the training data set into the new YOLOv5 network model, to perform calculation through the following formula:

$$s_i = \begin{cases} s_i, & IoU - R_{CIoU}(M, B_i) < \varepsilon \\ 0, & IoU - R_{CIoU}(M, B_i) \geq \varepsilon \end{cases} \quad (1)$$

IoU is an aspect ratio of a predicted box and a ground truth box, and is expressed by:

$$IoU = \frac{|b \cap b^{gt}|}{|b \cup b^{gt}|} \quad (2)$$

$R_{CIoU}$ is a center-to-center distance between an overlapping area and the ground truth box, and is expressed by:

$$R_{CIoU} = \frac{\rho^2(b, b^{gt})}{c^2} + \alpha\mu \quad (3)$$

$$\alpha = \frac{\mu}{(1 - IoU) + \mu} \quad (4)$$

$$\mu = \frac{4}{\pi^2}\left(\arctan\frac{\omega^{gt}}{h^{gt}} - \arctan\frac{\omega}{h}\right)^2 \quad (5)$$

$s_i$ is a classification score of object of each class, $\varepsilon$ is an artificially set NMS threshold, M is a value of predicted box with a highest score, $B_i$ is a list of the predicted boxes, b is a predicted box, $b^{gt}$ is a ground truth box, $\rho^2(b, b^{gt})$ is a center-to-center distance between the predicted box and the ground truth box, and is expressed by a diagonal length of a smallest enclosing rectangular box covering the predicted box and the ground truth box, $\omega^{gt}$ and $h^{gt}$ respectively indicate width and height of the ground truth box, and $\omega$ and h respectively indicate width and height of the predicted box;

S240: during the training in the S230, due to problems of suppression of the predicted box, when a difference between of the predicted box M with the highest score and IoU-CIoU of another box $B_i$ is less than the set threshold $\varepsilon$, keeping a score $s_i$ of the box $B_i$ unchanged; otherwise, directly changing $s_i$ to 0, to filter out the predicted box; and calculating loss functions which including an object loss function, a class loss function, and a box loss function, performing repeated iterative training to minimize the loss functions, and obtaining optimal parameters of the network model; and S300: detecting a to-be-detected image: resizing the to-be-detected image through the method in S210 and inputting resized images into the trained new YOLOv5 network model for prediction, outputting the predicted box of an object and probability values corresponding to a class to which the object belongs, and setting a class corresponding to a maximum probability value as a predicted class of the object in the to-be-detected image.

Optionally, when constructing the training data set in the S210, Mosaic data augmentation is performed on the N labeled images to increase a data amount of the training data set.

Compared with the prior art, the present disclosure has at least the following advantages.

1. The method for object detection and recognition based on a neural network provided in the present disclosure may quickly detect and recognize multiple classes of objects in the test image. In particular, an ability to detect small objects is improved significantly, and accurate detection and recognition for multiple compactly arranged objects are made possible. The method designed in the present disclosure has the higher detection and recognition accuracy, and the detection speed can meet real-time requirements. In addition, the method achieves better detection effects and stronger overall robustness in complex environments such as complex backgrounds and dim light.

2. The method in the present disclosure improves the three detection layers of the existing YOLOv5 network model by adding one more detection layer, to detect smaller objects. occurs in the model, when an image input into the model is 640*640 pixels and three receptive fields of an original model are 20*20, 40*40, and 80*80 pixels, that is, when the length and width of the small objects and a distance between the multiple objects are less than 8 pixels. In reality, many images of the small objects are often smaller than the above-mentioned size. By adding a detection layer, an increased receptive field is 160*160 pixels, so that the network model may detect objects greater than or equal to 4*4 pixels. The situations in which multiple objects are compactly arranged can be addressed to satisfy actual needs.

3. The present disclosure uses a CIoU-NMS method to suppress the predicted box. The CIoU-NMS considers an overlapping area between the predicted box and the ground truth box, a distance of center-to center between the predicted box and the ground truth box, and an aspect ratio between the predicted box and the ground truth box accordingly. Therefore, the detection accuracy of the model is higher and the false negative is mitigated.

BRIEF DESCRIPTION OF THE DRAWINGS

FIG. 1 is a network model diagram of a new YOLOv5 network model according to the present disclosure.

DETAILED DESCRIPTION OF THE EMBODIMENTS

The present disclosure will be illustrated in detail with reference to the accompanying drawings.

Embodiment 1

A method for object detection and recognition based on a neural network includes the following steps.

S100: Constructing a new YOLOv5 network model by adding a detection layer following three detection layers of the existing YOLOv5 network model.

S200: Training the new YOLOv5 network model, where a specific training process includes:

S210: Constructing a training data set: acquiring N images, resizing each of the images to make it suitable for model training, and labeling each image, to be specific, labeling the image with ground truth boxes and object class labels, performing Mosaic data augmentation on the N labeled images to augment the training data set, and constructing the training data set using all the images obtained after Mosaic data augmentation.

S220: Setting thresholds for a center-to-center distance and an aspect ratio of the new YOLOv5 network model.

S230: Initializing parameters in the new YOLOv5 network model.

Inputting all samples of the training data set into the new YOLOv5 network model, to perform calculation through the following formula:

$$s_i = \begin{cases} s_i, IoU - R_{CIoU}(M, B_i) < \varepsilon \\ 0, IoU - R_{CIoU}(M, B_i) \geq \varepsilon \end{cases} \quad (1)$$

IoU is an aspect ratio of a predicted box and a ground truth box, and is expressed by:

$$IoU = \frac{|b \cap b^{gt}|}{|b \cup b^{gt}|} \quad (2)$$

$R_{CIoU}$ is a center-to-center distance between an overlapping area and the ground truth box, and is expressed by:

$$R_{CIoU} = \frac{\rho^2(b, b^{gt})}{c^2} + \alpha\mu \quad (3)$$

$$\alpha = \frac{\mu}{(1 - IoU) + \mu} \quad (4)$$

$$\mu = \frac{4}{\pi^2}\left(\arctan\frac{\omega^{gt}}{h^{gt}} - \arctan\frac{\omega}{h}\right)^2 \quad (5)$$

$s_i$ is a classification score of an object of each class, $\varepsilon$ is an artificially set NMS threshold, M is a value of the predicted box with a highest score, $B_i$ is a list of the predicted boxes, b is the predicted box, $b^{gt}$ is the ground truth box, $\rho^2(b, b^{gt})$ is the center-to-center distance between the predicted box and the ground truth box, and is expressed by a diagonal length of a smallest enclosing rectangular box covering the predicted box and the ground truth box, $\omega^{gt}$ and $h^{gt}$ respectively indicate width and height of the ground truth box, and $\omega$ and h respectively indicate width and height of the predicted box.

S240: During the training in S230, due to suppression problems of the predicted box, when a difference between IoU-CIoU of the predicted box M with the highest score and IoU-CIoU of another box $B_i$ is less than the set threshold $\varepsilon$, keeping a score $s_i$ of the box $B_i$ unchanged; otherwise, directly changing $s_i$ to 0, to filter out the predicted box; and calculating loss functions where including an object loss function, a class loss function, and a box loss function, performing repeated iterative training to minimize the loss functions, and obtaining optimal parameters of the network model, where the loss function, the class loss function, and the box loss function are know from the prior art. Details are not described herein.

S300: Detecting a to-be-detected image: resizing the to-be-detected image through the method in S210 and inputting it into the trained new YOLOv5 network model for prediction, outputting a predicted box of an object and probability values corresponding to the class to which the object belongs, and setting a class corresponding to a maximum probability value as a predicted class of the object in the to-be-detected image.

The new YOLOv5 network model of the present disclosure specifically includes following four modules.

1. Input end 10: first, resizing an input image to make the input image suitable for model training, then performing Mosaic data augmentation to increase a data amount of the training set, and finally calculating an adaptive initial anchor box, which avoids anchor box classification through programs in the conventional method. The Mosaic data augmentation is an existing technology. In simple terms, it is to splice multiple images through random zooming, random cropping, and random arrangement. This method enriches the background and small objects of the detected object, and thus enriches the data set. The multiple images are randomly selected, randomly zoomed, and then randomly arranged for splicing, which greatly enriches a detection data set. Particularly, random zooming adds a lot of small objects, which may make robustness of the model better.

2. Backbone module 20: using Focus to slice the image, to change the original image from RGB three channels to 12 channels, which solves a problem of information loss in the image down-sampling process, and reduces calculation amount of the model accordingly. CBL represents a combined operation of convolution, regularization and a leaky relu activation function.

CSP is a cross stage partial network to resolve reasoning and calculation problems in the model, which improves the learning ability of the model and reduces the calculation time. This structure is applied in both Backbone and Neck.

3. Neck module 30: a structure adopts combined Feature Pyramid Network (FPN) and Pyramid Attention Network (PAN), and carries out information transmission and fusion mainly through up-sampling operation to obtain detection layers of different scales.

FIG. 1 shows an improvement on the basis of the three detection layers of the YOLOv5 network model by adding one more detection layer, such that improved YOLOv5 network model may detect smaller objects. When the size of an image input into the model is 640*640 pixels, three receptive fields of the original model are 20*20, 40*40, and 80*80, that is, when length and width of the small objects and a distance between the multiple objects are less than 8 pixels, false negative occurs in the model. In reality, many images of the small objects are often smaller than the above-mentioned size. By adding a detection layer, increased receptive field is 160*160 pixels, so that the network model may detect objects greater than or equal to 4*4 pixels. The situations in which multiple objects are compactly arranged can be addressed to satisfy actual needs.

4. Output end 40: mainly bounding box loss calculation and non-maximum suppression algorithm. A bounding box loss function adopts CIoU, which considers an overlapping area between the predicted box and the ground truth box, the center-to-center distance and the aspect ratio at the same time, and has higher accuracy than conventional IoU, GIoU, etc. CIoU-NMS is used to replace the conventional NMS method to suppress the predicted box. The conventional NMS method is to artificially set a threshold. When an intersection over union between the predicted box and the ground truth box is greater than this threshold, the predicted box is retained; otherwise, the predicted box is directly discarded. This processing method directly eliminates the possibility of this predicted box as another object, which is very rude, leading to false negative and low recall. CIoU-NMS considers the overlapping area between the predicted box and the ground truth box, the center-to-center distance between the predicted box and the ground truth box, and the aspect ratio of the predicted box and the ground truth box accordingly.

Experiment Comparison

The present disclosure conducts experiments on a public DOTA data set disclosed, and compares a detection accuracy with the existing SSD, Faster R-CNN, YOLOv2 and YOLOv5 algorithms, mainly compares aircraft and ship objects in the data set. The comparison results are shown in Table 1:

TABLE 1

| Models | Aircraft detection accuracy (%) | Ship detection accuracy (%) |
| --- | --- | --- |
| SSD | 57.85 | 24.74 |
| Faster R-CNN | 80.32 | 50.04 |
| YOLOv2 | 76.90 | 52.37 |
| YOLOv5 | 93.04 | 85.82 |
| New YOLOv5 | 94.26 | 91.40 |

It may be learned from the Table 1 that the accuracy of the method of the present disclosure for the aircraft objects and the ship objects are as high as 90%, which is far higher than the existing methods.

Finally, it should be noted that above embodiments are only intended to explain, rather than to limit, the technical solution of the present disclosure. Although the present disclosure is described in detail with reference to the preferred embodiment, those ordinarily skilled in the art should understand that modifications or equivalent substitutions made to the technical solutions of the present invention without departing from the spirit and scope of the technical solution of the present disclosure should be included within the scope of the claims of the present disclosure.

What is claimed is:

1. A method for object detection and recognition based on a neural network, comprising:
    S100: constructing a new YOLOv5 network model by adding a detection layer following three detection layers of an existing YOLOv5 network model;
    S200: training the new YOLOv5 network model, wherein a specific training process comprises:
    S210: constructing a training data set: acquiring N images, resizing each of the N images to make it suitable for model training, and labeling each of the N images with ground truth boxes and object class labels, wherein all of the N labeled images constitute the training data set;
    S220: setting thresholds for a center-to-center distance and an aspect ratio of the new YOLOv5 network model;
    S230: initializing parameters in the new YOLOv5 network model;
    inputting all samples of the training data set into the new YOLOv5 network model, performing calculation through a following formula:

$$s_i = \begin{cases} s_i, & IoU - R_{CIoU}(M, B_i) < \varepsilon \\ 0, & IoU - R_{CIoU}(M, B_i) \geq \varepsilon \end{cases} \quad (1)$$

IoU represents an aspect ratio of a predicted box and a ground truth box, and is expressed by:

$$IoU = \frac{|b \cap b^{gt}|}{|b \cup b^{gt}|} \quad (2)$$

$R_{CIoU}$ represents a distance between a center point of the ground truth box and a center point of an overlapping area between the predicted box and the ground truth box, and is expressed by:

$$R_{CIoU} = \frac{\rho^2(b, b^{gt})}{c^2} + \alpha\mu \quad (3)$$

$$\alpha = \frac{\mu}{(1 - IoU) + \mu} \quad (4)$$

$$\mu = \frac{4}{\pi^2}\left(\arctan\frac{\omega^{gt}}{h^{gt}} - \arctan\frac{\omega}{h}\right)^2 \quad (5)$$

where $s_i$ represents a classification score of an object of each class, $\varepsilon$ represents an artificially set NMS threshold, M represents a value of the predicted box with a highest score, $B_i$ represents a list of the predicted boxes, b represents the predicted box, $b^{gt}$ represents the ground truth box, $\rho^2(b, b^{gt})$ represents a distance between a center point of the predicted box and the center point of the ground truth box, and is expressed by a diagonal length of a smallest enclosing rectangular box covering the predicted box and the ground truth box, $\omega^{gt}$ and $h^{gt}$ respectively indicate width and height of the ground truth box, $\omega$ and h respectively indicate width and height of the predicted box;

S240: during the training in S230, due to suppression problems of the predicted box, when a difference between IoU-CIoU of the predicted box M with the highest score and IoU-CIoU of another box $B_i$ is less than the set threshold $\varepsilon$, keeping a score $s_i$ of the box $B_i$ unchanged; otherwise, directly changing $s_i$ to 0, to filter out the predicted box; and calculating loss functions, the loss functions include an object loss function, a class loss function, and a box loss function, performing repeated iterative training to minimize the loss functions, and obtaining optimal parameters of the network model; and S300: detecting a to-be-detected image: resizing the to-be-detected image through the method in S210 and inputting resized images into the trained new YOLOv5 network model for prediction, outputting the predicted box of an object and probability values corresponding to a class to which the object belongs, and setting a class corresponding to a maximum probability value as a predicted class of the object in the to-be-detected image.

2. The method for object detection and recognition based on a neural network according to claim 1, wherein when constructing the training data set in the S210, Mosaic data augmentation is performed on the N labeled images to increase a data amount of the training data set.

* * * * *